L. ENGLUND.
DOMESTIC BOILER.
APPLICATION FILED DEC. 2, 1912.

1,072,105.

Patented Sept. 2, 1913.
2 SHEETS—SHEET 1.

Witnesses
Robert M. Sutphen
A. L. Hind

Inventor
LEON ENGLUND

By Watson E. Coleman
Attorney

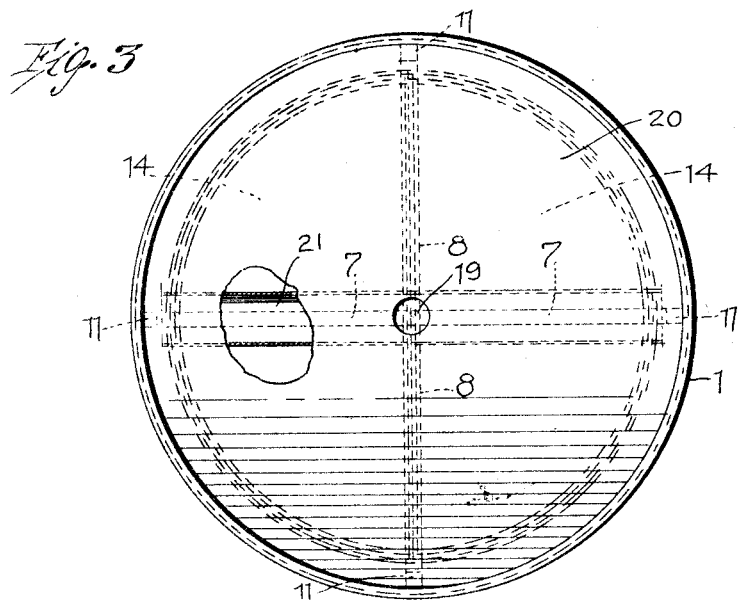
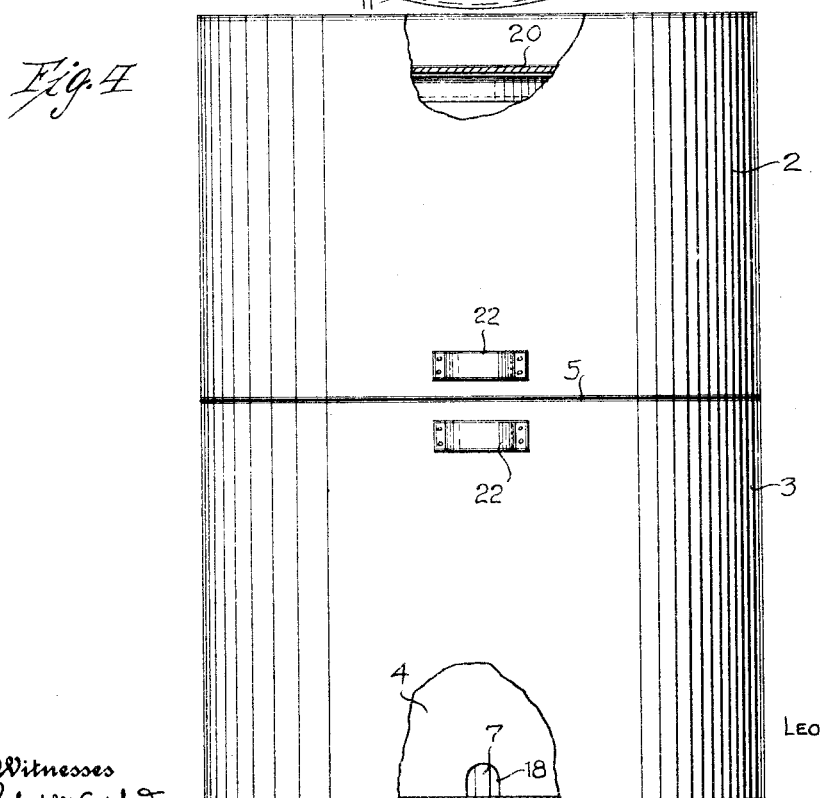

UNITED STATES PATENT OFFICE.

LEON ENGLUND, OF PITTSFIELD, MASSACHUSETTS.

DOMESTIC BOILER.

1,072,105.   Specification of Letters Patent.   Patented Sept. 2, 1913.

Application filed December 2, 1912. Serial No. 734,606.

*To all whom it may concern:*

Be it known that I, LEON ENGLUND, a citizen of the United States, residing at Pittsfield, in the county of Berkshire and State of Massachusetts, have invented certain new and useful Improvements in Domestic Boilers, of which the following is a specification, reference being had to the accompanying drawings.

This invention relates to new and useful improvements in domestic cooking boilers, an object thereof is the provision of a boiler of this class in which several kinds of food may be cooked at the same time.

A further object of this invention is the provision of a boiler comprising a cylindrical casing formed of two sections telescopically connected together, and a plurality of receptacles removably disposed within the casing.

A still further object of this invention is the provision of a cooking boiler comprising a cylindrical casing composed of two sections telescopically connected together, and means for automatically allowing steam to escape when the pressure thereof becomes too great in the casing.

With these and other objects in view, my invention consists in certain novel constructions, combinations and arrangements of parts to be hereinafter more fully described, claimed and illustrated in the accompanying drawings, in which—

Figure 1:
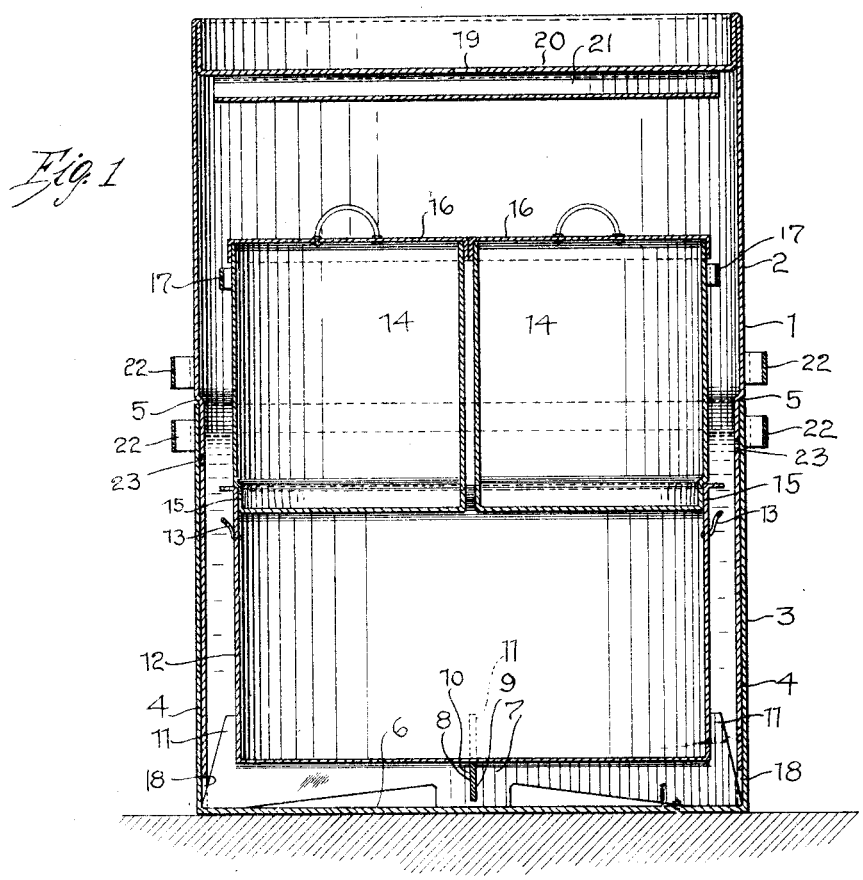
Figure 2:
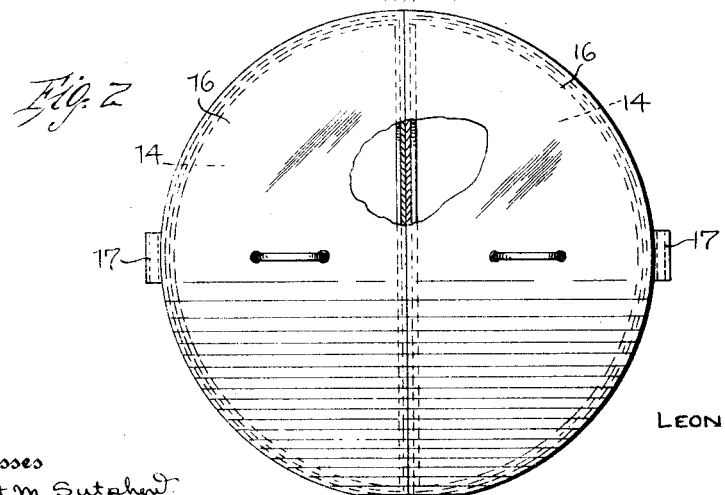

Figure 1 is a vertical section of my device. Fig. 2 is a top plan view thereof partly in section. Fig. 3 is a top plan view partly in section showing the interior parts in dotted lines, and Fig. 4 is a side elevation of my device also partly in section.

Referring more particularly to the drawings, the numeral 1 designates generally a cylindrical casing comprising an upper section 2 and a lower section 3, the upper section being reduced at its lower end as at 4 and adapted to slidingly engage in the lower section 3, the shoulder 5 formed by the reduced portion of the upper section forming a stop to limit the movement of the upper section within the lower section of the casing. Seated on the base 6 of the lower section 3 is a supporting member comprising bars 7 and 8, the bar 7 being formed intermediate of its ends with an upwardly opening slot 9 and the bar 8 being formed intermediate of its ends with a downwardly opening slot 10. The slots of the bars are adapted to be engaged to hold said bars together, and the ends of the bars are adapted to extend to the wall of the casing so that the supporting member will be held from movement therein. The bars 7 and 8 are formed near their opposite ends with upstanding lugs 11 and seated upon the supporting member is a cylindrical receptacle 12 which is of substantially less diameter than the casing and is relatively of less height than the height of the lower section 3 of the casing. The upstanding lugs 11 on the bars of the supporting member are adapted to engage the periphery of the receptacle 12 to prevent lateral movement of the receptacle with relation to the casing and also to maintain the receptacle 12 in spaced relation with the wall of the casing. Suitable handles 13 are secured to the receptacle 12 whereby the receptacle may be readily removed from the casing.

Semicylindrical receptacles 14 are supported upon the upper edge of the receptacle 12, the receptacles 14 being formed on their lower faces with arcuate grooves 15 near the marginal edge of the receptacles, the grooves 15 being adapted to engage the upper peripheral edge of the receptacle 12 whereby the receptacles 14 are held from lateral movement in the casing and also maintained in spaced relation with the inner wall thereof. Suitable covers 16 are removably secured to the tops of the receptacles 14 and it will be seen that the receptacles 14 provide a cover for the receptacle 12 of the device. Handles 17 may be secured to the opposite sides of the receptacles 14 for removing the receptacles when desired. If desired, the reduced extension 4 of the upper section of the casing 2 may extend to the bottom of the section 3 and the lower extremity of the extension 4 may be formed with a plurality of diametrically opposed slots 18 which are adapted to engage over the bars 7 and 8 of the supporting member.

To provide for the escape of steam from the casing, an opening 19 is formed in the central portion of the cover 20 of the casing, and this opening 19 may be also used to replenish the supply of water in the boiler and in this connection I provide a transversely extending channel iron 21 which is secured to the lower face of the cover 20, the opposite ends of the channel iron 21 extending to points adjacent the wall of the casing whereby the water may flow to the bottom of the casing between the inner periphery thereof and the outer peripheries of the receptacles supported within the casing. If desired, handles 22 may be secured to the upper and lower sections of the casing whereby the sections may be carried separately or the entire casing may be carried by the handles 22 on the lower section thereof.

The operation of my device is as follows:—In the practical use of my invention, food is placed in the receptacles 12 and 14, whereupon the receptacle 12 is disposed on the bars 7 and 8 inwardly of the lugs 11 thereon so that the receptacle is spaced from the wall of the casing, and the receptacles 14 mounted on the receptacle 12 with the grooves 15 in engagement with the upper edge of the receptacle 12 whereby the receptacles 14 are also held in spaced relation with the casing. Water may be then poured in the lower section 3 of the boiler, the receptacle 12 being maintained above the water by the supporting bars 7 and 8. The reduced end 4 of the upper section will then be telescopically mounted within the lower section 3 of the casing and the boiler is then ready for use. It is apparent that the steam generated from the water in the casing will cook the food contained within the several receptacles and should the pressure of the steam within the casing become too great, the upper section 2 will be forced upwardly by reason of the pressure, so that steam may escape through the openings 23 formed in the reduced portion of the upper section of the casing. It will be seen that when the pressure has been relieved within the casing, the upper section 2 will again move downwardly within the lower section 3 until the pressure within the casing again becomes too great.

It will be seen from the above description taken in connection with the accompanying drawings that I have provided a cooking boiler in which several varieties of foods may be cooked at the same time, the boiler being formed of a minimum number of parts whereby it may be cheaply manufactured.

While the construction illustrated in the accompanying drawings gives the preferred embodiment of my invention, it will be understood that minor changes in construction may be made without departing from the spirit of my invention or sacrificing any of its advantages as determined by the scope of the appended claims.

Having thus described my invention, what I desire to claim and secure by Letters Patent is:—

1. A boiler comprising a casing, a cylindrical receptacle disposed within said casing, a pair of semi-cylindrical receptacles, each of said semi-cylindrical receptacles having a groove formed in its curved face at its lower extremity, the grooves in said receptacles being adapted for engagement with the upper edge of the first mentioned receptacle, as and for the purpose described.

2. A boiler of the character described comprising a sectional casing, a supporting member disposed within said casing, a cylindrical receptacle mounted on said supporting member, semi-cylindrical receptacles having arcuate grooves therein disposed upon the first mentioned receptacle, the grooves in the semi-cylindrical receptacles being adapted for engagement with the upper edge of the first mentioned receptacle, as and for the purpose described.

3. A boiler comprising a casing, a cylindrical receptacle disposed within said casing, semi-cylindrical receptacles mounted on the first mentioned receptacle, each of said semi-cylindrical receptacles having a groove formed in its curved face at its lower extremity, said grooves being adapted for engagement with the upper edge of the first mentioned receptacle, said semi-cylindrical receptacles when in engagement with the first mentioned receptacle being of substantially the same diameter as said first mentioned receptacle, whereby relative movement of the several receptacles is prevented.

4. In a device of the character described, a casing comprising an upper and a lower section, a receptacle disposed in said casing in spaced relation with the wall thereof, the upper section having a central opening formed therein, and a channel member extending transversely of the upper section and disposed below the opening therein, the opposite ends of said channel member terminating in vertical alinement with the space between the periphery of the receptacle and wall of the casing, as and for the purpose described.

5. In a device of the character described, a casing comprising an upper and a lower section telescopically connected together, a receptacle disposed in the lower section in spaced relation with the wall thereof, the upper section having a central opening formed therein, and a channel member extending transversely of the upper section and disposed below the opening therein substantially as and for the purpose set forth.

In testimony whereof I hereunto affix my signature in the presence of two witnesses.

LEON ENGLUND.

Witnesses:
AUGUSTIN ADREAN,
ANNIE PAYNE.